(12) United States Patent
Kee et al.

(10) Patent No.: US 7,876,286 B2
(45) Date of Patent: Jan. 25, 2011

(54) MULTI-DISPLAY APPARATUS AND METHOD THEREOF

(75) Inventors: In-seo Kee, Yongin-si (KR); Hong-shik Shim, Yongin-si (KR); Young-gu Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 839 days.

(21) Appl. No.: 11/758,731

(22) Filed: Jun. 6, 2007

(65) Prior Publication Data

US 2008/0079656 A1   Apr. 3, 2008

(30) Foreign Application Priority Data

Sep. 29, 2006   (KR) ...................... 10-2006-0096125

(51) Int. Cl.
*G09G 5/00* (2006.01)
*G06F 1/16* (2006.01)

(52) U.S. Cl. .................................. 345/1.3; 361/679.21

(58) Field of Classification Search ............ 361/679.27, 361/681; 345/1.1, 1.3, 901, 903; 455/566; 349/73, 187
See application file for complete search history.

(56) References Cited

U.S. PATENT DOCUMENTS

| | | | | |
|---|---|---|---|---|
| 5,903,328 | A | * | 5/1999 | Greene et al. .................. 349/73 |
| 7,489,286 | B2 | * | 2/2009 | Kawase et al. ............... 345/1.1 |

\* cited by examiner

*Primary Examiner*—Kevin M Nguyen
(74) *Attorney, Agent, or Firm*—Cantor Colburn LLP

(57) ABSTRACT

In a multi-display device, first and second panels, each of which has a display device, are stuck fast to each other to embody a screen. The first panel has an interface surface formed of a hard material, and the second panel has an interface surface formed of a soft material. Thus, the soft material is elastically compressed and transformed by the hard material so that the two panels are closely in contact with each other, and formation of air gaps is prevented at the joint between the panels. As a result, image cutting in a screen due to a luminance difference can be minimized so that an image can be naturally connected between the two panels.

27 Claims, 6 Drawing Sheets

MULTI-DISPLAY APPARATUS AND METHOD THEREOF

This application claims priority to Korean Patent Application No. 10-2006-0096125, filed on Sep. 29, 2006, and all the benefits accruing therefrom under 35 U.S.C. §119, the contents of which in its entirety are herein incorporated by reference.

BACKGROUND OF THE INVENTION

1. Field of the Invention

The present invention relates to a multi-display device and method thereof, in which a plurality of panels are connected to form a screen, and more particularly, to a multi-display device and method thereof that can minimize image cutting at a joint of a screen.

2. Description of the Related Art

In general, a multi-display device includes a plurality of display panels that are connected to form a large screen. In the beginning, a large screen TV, e.g., a large-sized TV for exhibitions was constructed by connecting a plurality of cathode-ray tubes ("CRTs"). In recent years, owing to the increased demand for large screens even in small-sized portable devices, for example, portable phones or personal digital assistants ("PDAs"), a device in which a large screen is formed by connecting flat panel displays ("FPDs"), such as liquid crystal displays ("LCDs"), field emission displays ("FEDs"), plasma display panels ("PDPs"), and organic light emitting diodes ("OLEDs"), has been introduced.

Figure 1:
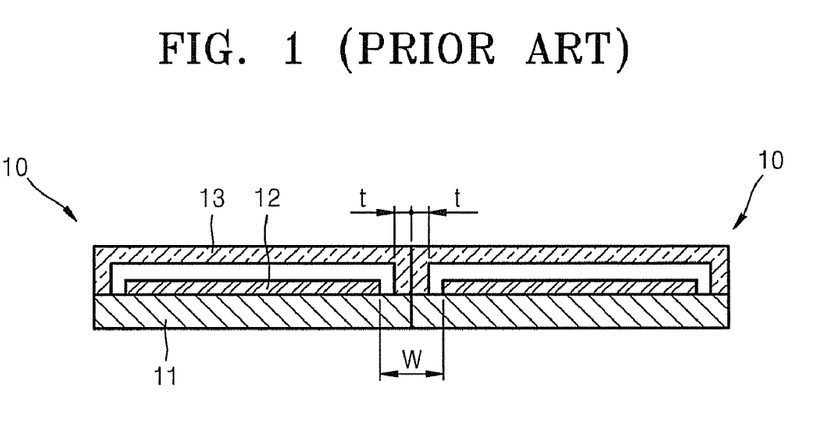
FIG. 1 is a cross sectional view of an example of a conventional multi-display device.

Conventionally, a multi-display device has been fabricated by connecting unit panels 10 in a row as illustrated in FIG. 1. In other words, a plurality of unit panels 10 are prepared and connected side by side to fabricate a multi-screen. However, in this case, the screen is not naturally connected at a joint between two display devices 12 of the panels 10 so that a viewer may have image cutting in the screen. Specifically, in an FPD shown in FIG. 1, a display device 12 forming pixels is mounted on a glass substrate 11 and a glass cover 13 is attached onto the glass substrate 11 to encapsulate the display device 12. In this case, since the glass cover 13 has a thickness "t" and the display device 12 is disposed inward from the glass cover 13, a distance between the two panels 10 (i.e., a cutting distance in the screen) becomes as much as "w". It is difficult to reduce the distance "w" since the distance "w" is essential for the protection of the display device 12 using the glass cover 13. As a result, the FPD shown in FIG. 1 has a specific technical limit in improving the sense of image cutting at the joint of the screen.

Figure 2:
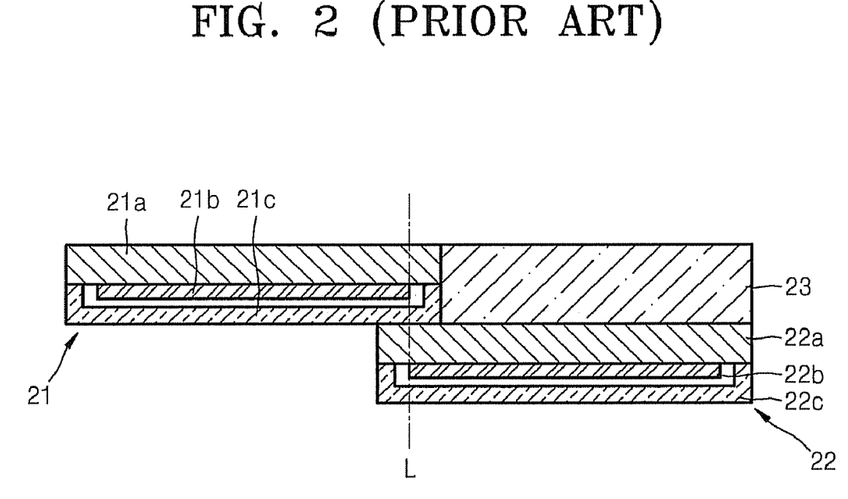
FIG. 2 is a cross sectional view of another example of a conventional multi-display device.

In order to overcome this drawback, a new structure as illustrated in FIG. 2 in which two unit panels 21 and 22 are vertically stacked with a step difference has been proposed. Specifically, the first and second panels 21 and 22 are vertically disposed with a step difference therebetween, and an interface of a right pixel of the display device 21b of the first panel 21 and an interface of a left pixel of the display device 22b of the second panel 22 are fit on the same vertical line "L", so that a feeling of image cutting at a joint of a screen made by the two panels 21 and 22 can be minimized. A cover 21c protecting the display device 21b of the first panel 21 overlaps and is partially disposed on a substrate 22a of the second panel 22. The display device 22b is protected by a cover 22c. In this structure, the two panels 21 and 22 form a connected screen, and a transparent plate 23 is installed on the substrate 22a of the second panel 22 so as to be coplanar with a substrate 21a of the first panel 21, so that the two panels 21 and 22 form a planar top surface.

In the foregoing conventional multi-display devices, two panels are hinge jointed to each other, thereby forming a folder type display that can be easily transported. Thus, the two panels are folded when the display device is transported, and unfolded to form one screen during use as illustrated in FIGS. 1 and 2.

Figure 3:
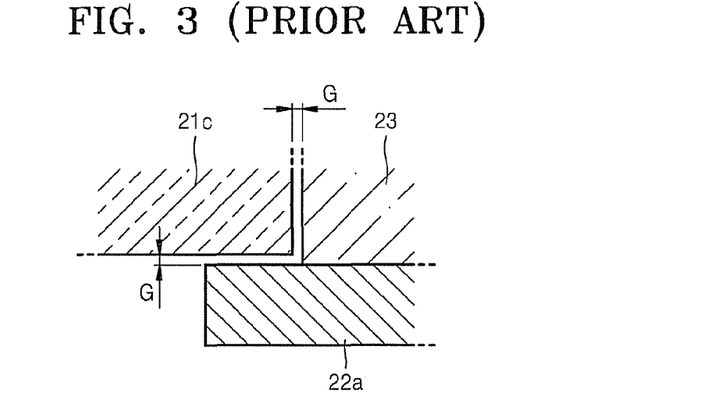
FIG. 3 is a magnified view showing air gaps formed between unit panels of the structure shown in FIG. 2.

However, since these multi-display devices are constructed such that two separated panels are unfolded to form a single screen, even if the panels are precisely fabricated according to the mechanical tolerances, air gaps still exist between the two panels. For example, as shown in FIG. 3, air gaps "G" exist not only between a bottom surface of the cover 21c of the panel 21 and a top surface of the substrate 22a of the panel 22 but also between a right surface of the cover 21c of the panel 21 and a left surface of the transparent plate 23. Thus, the conditions under which light is reflected are changed in the air gaps "G" so that the screen may look darker in areas corresponding to air gaps "G" than in other portions. In other words, when the screen has the air gap "G" with a different refractive index, light in the air gap "G" is refracted or reflected under different conditions, with the result that the air gap "G" looks dark to the eyes of a viewer. Therefore, even if the two panels 21 and 22 are disposed with a step difference in order to eliminate image cutting at the joint of the screen, another kind of image cutting is sensed in the screen due to a difference in luminance. Furthermore, the multi-display device shown in FIG. 1 amplifies the sense of image cutting in the screen because of the big distance "w" between the two display devices 12 of the panels 10.

BRIEF SUMMARY OF THE INVENTION

Therefore, the present invention provides a multi-display device that can solve the problem of luminance difference at a joint of a screen to display a natural image. That is, the present invention provides a multi-display device that can suppress a comparative luminance difference at a joint of a screen so that image cutting in the screen is reduced and a natural image is displayed.

According to exemplary embodiments of the present invention, a multi-display device includes first and second panels, each panel having a display device, are stuck fast to each other to form a screen. The first panel has an interface surface formed of a hard material, while the second panel has an interface surface formed of a soft material. Also, the soft material is elastically compressed and transformed by the hard material.

The hard material may be glass, and the soft material may be transmissive plastic, the soft material may be a soft substance coated on glass, or the soft material may be a soft adhesive tape attached onto glass.

Each of the panels may include a substrate on which a respective display device is installed, and a cover protecting the respective display device.

The two panels may be connected with a step difference such that the display devices of the panels form a connected screen. Also, the first or second panel may further include a transparent plate installed thereon so that the two panels form a substantially planar top surface, and the interface surface of the first or second panel may be formed on the transparent plate. Further, the two panels may be combined to form a folding type multi-display device that can be easily transported. The transparent plate include may include plastic as the soft material.

The cover of the first panel may overlap with the substrate of the second panel, the cover of the first panel and the substrate of the second panel may be made of glass, and an air gap may be maintained between overlapping portions of the cover of the first panel and the substrate of the second panel. Alternatively, the cover of the first panel may overlap with the substrate of the second panel, the cover of the first panel may be made of a material having a different hardness level than a hardness level of the substrate of the second panel, and the interface surfaces of the first and second panels may further include overlapping portions between the cover of the first panel and the substrate of the second panel, respectively.

The hard material and the soft material may have substantially a same refractive index.

According to other exemplary embodiments of the present invention, a multi-display apparatus includes a plurality of unit panels, each unit panel including a display device and an interface surface, wherein the interface surface of each unit panel has a hardness level different from a hardness level of an interface surface of an adjoining unit panel, such that an interface surface having a lower hardness level may be elastically compressed and transformed by an interface surface having a higher hardness level.

The unit panels may partially overlap each other, and the interface surface of half of the unit panels may be formed on a step difference-eliminating transparent plate.

The unit panels may be joined together at the interface surfaces and air gaps may be prevented from occurring between interface surfaces of joined unit panels.

According to other exemplary embodiments of the present invention, a method of minimizing image cutting at a joint of a screen of a multi-display device, includes providing a first panel with a first display device and a first interface surface, providing a second panel with a second display device and a second interface surface softer than the first interface surface, and forming the screen by abutting the first interface surface to the second interface surface, wherein the second interface surface is elastically compressed and transformed by the first interface surface.

The method may further include arranging the first and second panels with a step difference, wherein providing the first panel or second panel further includes providing a transparent plate eliminating the step difference and having the first or second interface surface.

Abutting the first interface surface to the second interface surface may include removing an air gap between the first and second panels. The first panel may include glass at the first interface, and the second panel may include plastic at the second interface, and forming the screen may include pivoting the first panel with respect to the second panel.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present there between. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

Figure 4:
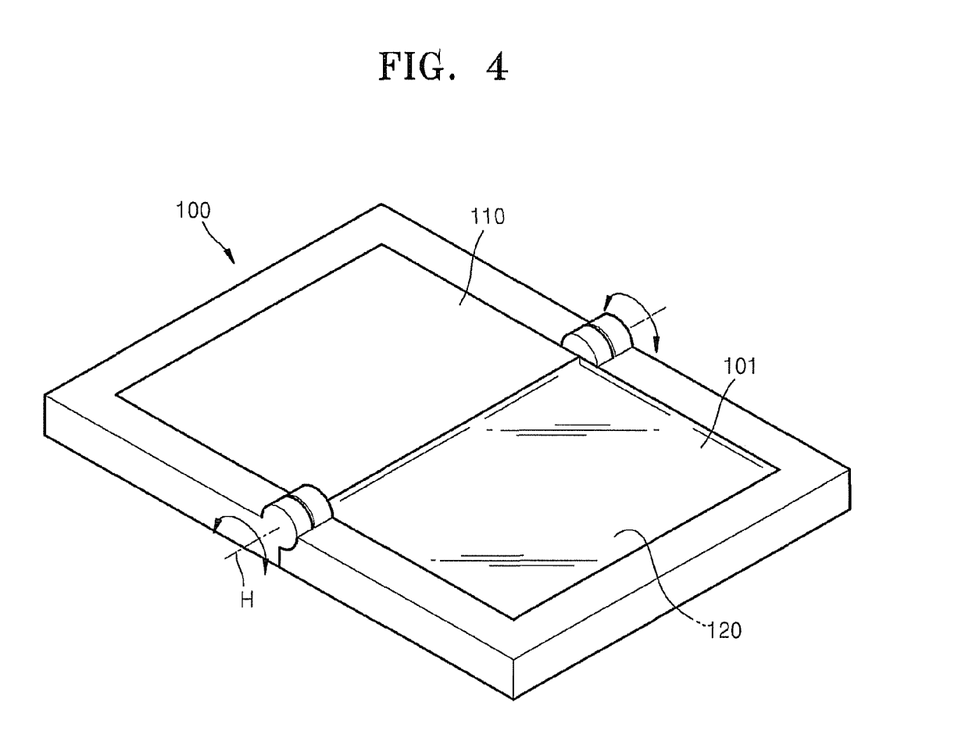
FIG. 4 is a perspective view of an exemplary multi-display device according to an exemplary embodiment of the present invention.
Figure 5:
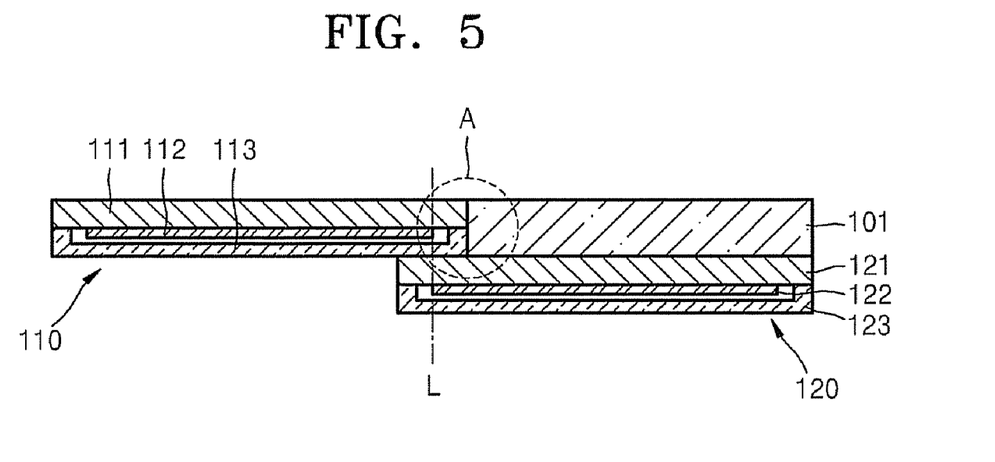
FIG. 5 is a cross sectional view of an exemplary connection structure of unit panels in the exemplary multi-display device shown in FIG. 4.

FIGS. 4 and 5 illustrate an exemplary multi-display device 100 according to an exemplary embodiment of the present invention. The multi-display device 100 can be fabricated by connecting any number of panels together, however, in the present embodiment, only two unit panels 110 and 120 will be exemplarily described for brevity. Referring to FIG. 5, the first unit panel 110 includes a display device 112 stacked on a substrate 111 to display an image, and a cover 113 is attached to the substrate 111 to encapsulate the display device 112. Likewise, the second unit panel 120 includes a display device 122 stacked on a substrate 121 to display an image, and a cover 123 is attached to the substrate 121 to encapsulate the display device 122. The substrates 111, 121 and covers 113, 123 may be made of transparent materials. An image created by the display device 112 (or 122) is displayed through the cover 113 (or 123) if the multi-display device 100 is of a top-emitting type, and displayed through the substrate 111 (or 121) if the multi-display device 100 is of a bottom-emitting type. In the illustrated embodiment, the multi-display device 100 is a bottom-emitting type display, and thus the image is displayed through the substrates 111, 121.

Referring to FIG. 4, the two unit panels 110 and 120 are combined on a hinge axis "H" to form a folding type multi-screen that can be folded and unfolded. Thus, when the unit panels 110 and 120 are unfolded, they are vertically stepped as illustrated in FIG. 5. Interfaces of the display devices 112 and 122 overlap each other so that screens made by the two panels 110 and 120 can be seen as a connected screen from a top view. The cover 113 partially overlaps and is partially disposed on the substrate 121, such that the display devices 112, 122 are aligned along vertical line L. A transparent plate 101 is installed on the substrate 121 so that the two panels 110 and 120 form a planar top surface. A thickness of the transparent plate 101 may be substantially the same as a thickness of the unit panel 110, so that a substantially planar top surface of the multi-display device 100 is achieved. Alternatively, a thickness of the transparent plate 101 may be slightly greater than a thickness of the unit panel 110, such that a small gap 114 is maintained between the cover 113 and the substrate 121, as will be further described below.

Figure 6:
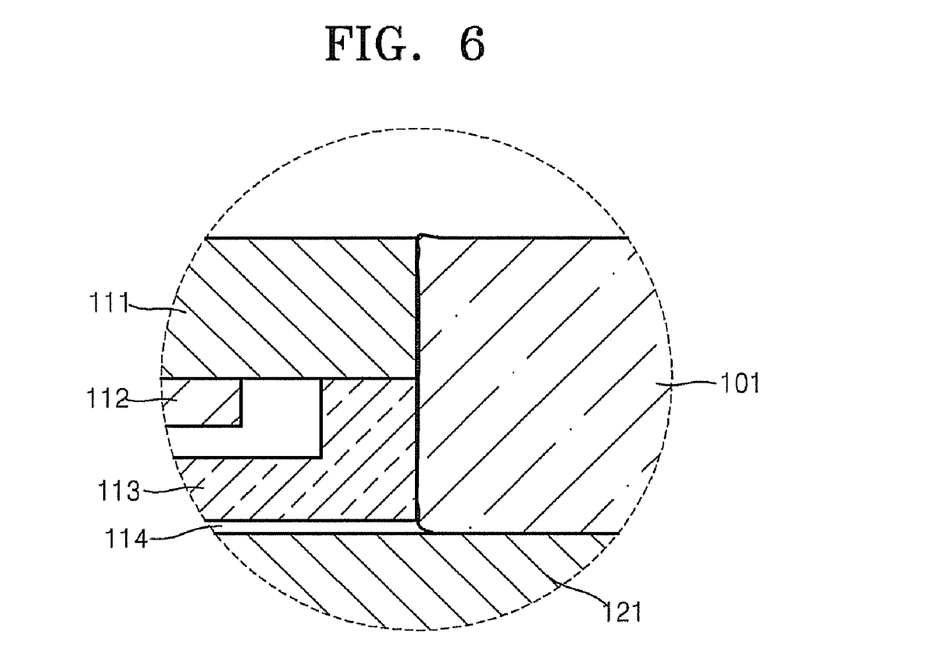
FIG. 6 is a magnified view of portion "A" shown in FIG. 5 in one exemplary embodiment of the present invention.

The panels 110 and 120 elastically contact each other at an interface surface (portion "A" in FIG. 5) as illustrated in FIG. 6. The interface surface of each panel 110, 120, which forms the joint in the image, may be formed by side faces of the substrate 111, cover 113, and transparent plate 101, such as the side faces of the substrate 111 and cover 113, and the side face of the transparent plate 101 that face each other and are arranged substantially perpendicular to a display surface of the multi-display device 100 in an open configuration. Specifically, the panel 110 includes the substrate 111 and the cover 113, while the panel 120 includes the substrate 121, the cover 123, and the transparent plate 101. An interface surface of the first panel 110 on the left side of the diagram may be formed of hard glass, whereas an interface surface of the second panel 120 on the right side of the diagram, such as a surface of the transparent plate 101 facing the first panel 110, may be formed of soft transmissive plastic. Thus, when the soft plastic is brought into contact with the hard glass, it loses its shape and is stuck fast to the hard glass. In the present embodiment, the transparent plate 101, which is included in the second panel 120 to make the top surface planar, may be made of soft plastic and is thus stuck to the substrate 111 and the cover 113 of the first panel 110. Therefore, in one exemplary embodiment, the substrate 111 and the cover 113 of the first panel 110 may be formed of a hard material, while the transparent plate 101 of the second panel 120 may be formed of a soft material. In this structure, the interfaces of the two panels 110 and 120 closely contact each other due to elastic compression and transformation, with the result that no air gap such as the gap "G" in FIG. 3 is formed at a joint between the panels 110 and 120. Accordingly, even if an image is displayed on the two panels 110 and 120, a viewer neither sees dark air gaps "G" nor senses image cutting in a screen. In this case, the hard material and the soft material should have substantially the same refractive index so that a difference in refractive index can be hardly indicated. Of course, in an alternative embodiment, the substrate 111 and the cover 113 of the first panel 110 may be formed of a soft material and the transparent plate 101 of the second panel 120 may be formed of a hard material. Furthermore, even if the transparent plate 101 is not interposed and panels, each of which includes only a substrate and a cover with a display device enclosed there between, closely come into contact with each other, one panel may be formed of a hard material and the other panel may be formed of a soft material, thus preventing formation of an air gap between the panels. For example, the substrate and cover of one panel may be formed of a hard material while the substrate and cover of an adjacent panel may be formed of a soft material. Furthermore, if more than two panels are used to form the multi-display device 100, the panels composed of a hard material and the panels composed of a soft material may be alternatingly arranged.

The interface surfaces having the gap-eliminating abutment may be limited to the facing sides of the first panel 110 and at least a portion of the second panel 120, such as the transparent plate 101, which are substantially perpendicular to the display surface of the multi-display device 100, as described above. In such an embodiment, the substrate 121 of the second panel 120 and the cover 113 of the first panel 110 may be made of the same material, such as glass. In this case, as shown in FIG. 6, a gap 114 may be formed between overlapping portions of the second panel 120 and the first panel 110, such as for preventing damage to the first and second panels 110, 120 at the time of opening.

Figure 7:
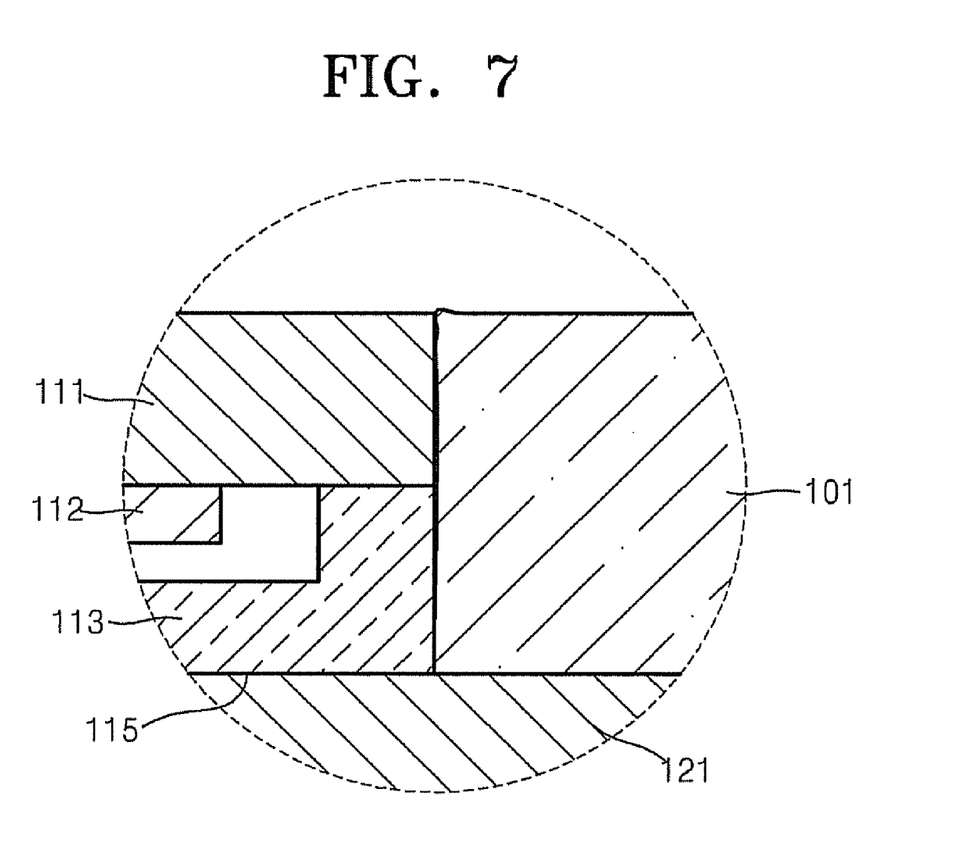
FIG. 7 is a magnified view of portion "A" shown in FIG. 5 in an alternative exemplary embodiment of the present invention.

Alternatively, as shown in FIG. 7, in an embodiment that includes the transparent plate 101, the interface surfaces may further include portions of the faces of the first panel 110 and the second panel 120 that face and overlap each other and that are substantially parallel to the display surface. That is, the interface surfaces may further include portions of the cover 113 of the first panel 110 and portions of the substrate 121 of the second panel 120 that overlap each other at an overlapping interface portion 115. To remove a gap that might otherwise form between the cover 113 of the first panel 110 and the substrate 121 of the second panel 120, the cover 113 and the substrate 121 may be made of materials having different hardness levels, such that the element made of a softer material may deform and become stuck fast to the element made of a harder material. Also, the transparent plate 101 may have a thickness substantially the same as a thickness of the first panel 101 for eliminating the gap at the overlapping interface portion 115 and maintaining a substantially flat top surface of the multi-display device. Alternatively, as will be further described below, a soft material may be included between the overlapping portions of the first panel 110 and the second panel 120 for eliminating the gap at the overlapping interface portion 115.

In order to eliminate image cutting at the joint of the screen when the multi-display device 100 according to the present invention is used, the distribution of luminance was measured along the full widths of the two panels 110 and 120.

Figure 8A:
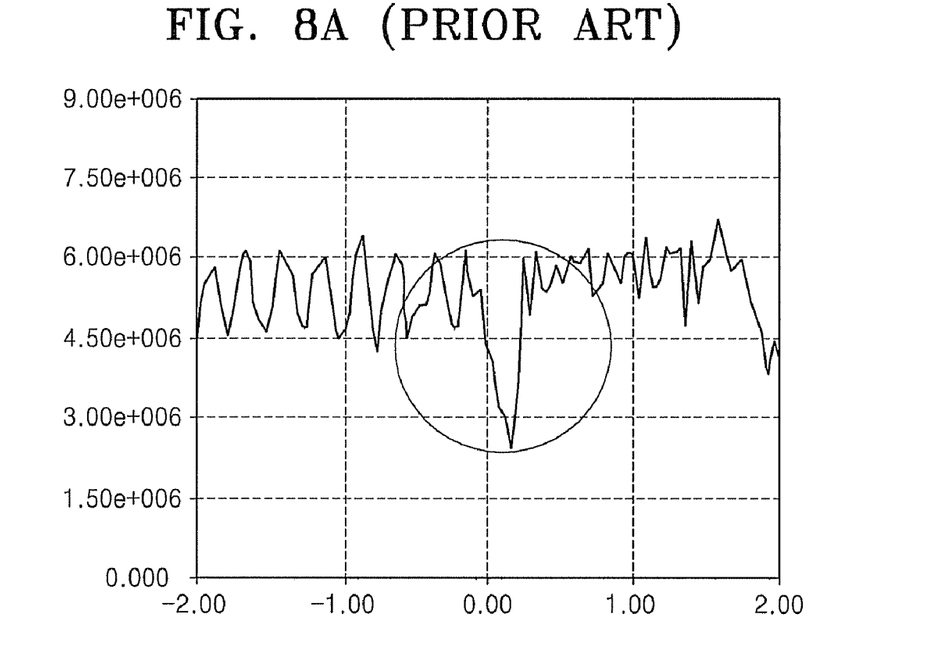
FIGS. 8A and 8B are graphs of measurement results showing the distributions of luminance in the conventional multi-display device and the exemplary multi-display device according to the present invention, respectively; and, FIGS. 9 and 10 are diagrams of modified examples of portion "A" shown in FIG. 6.

FIG. 8A is a graph of measurement results showing the distribution of luminance in the conventional multi-display device shown in FIG. 2, which has the air gaps "G". As expected, it can be observed, as indicated by the lowest dip within the encircled portion, that luminance measured at a joint where the air gap "G" is formed is far lower than in other portions.

Figure 8B:
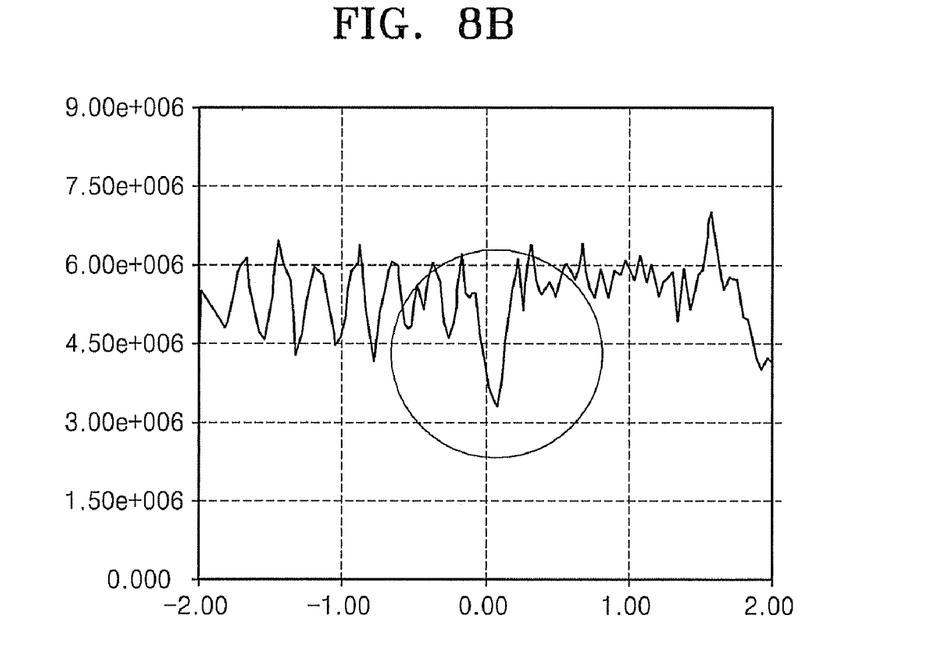

FIG. 8B is a graph of measurement results showing the distribution of luminance in the multi-display device 100 according to the present invention. On comparing FIG. 8B with FIG. 8A, it can be seen that luminance deviation at the joint of the screen greatly improves so that luminance measured at the joint increases twice as much as that of the conventional multi-display device. This is because formation of the air gaps "G" is prevented due to elastic adhesion of the panels 110 and 120 to each other, so that differences in conditions under which light is refracted and reflected are considerably reduced. Therefore, no noticeable difference can be distinguished between the panels, thus resulting in a naturally connected screen.

Figure 9:
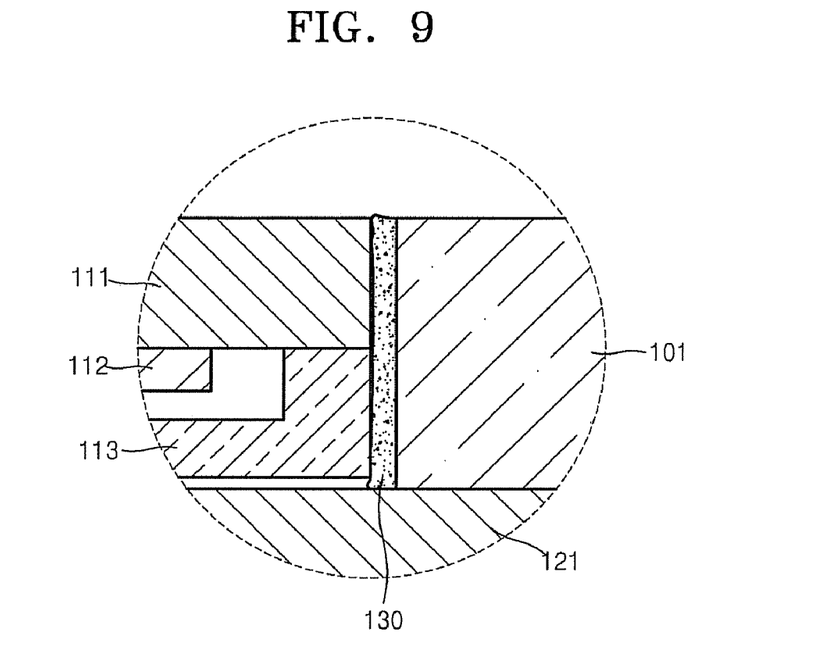
Figure 10:
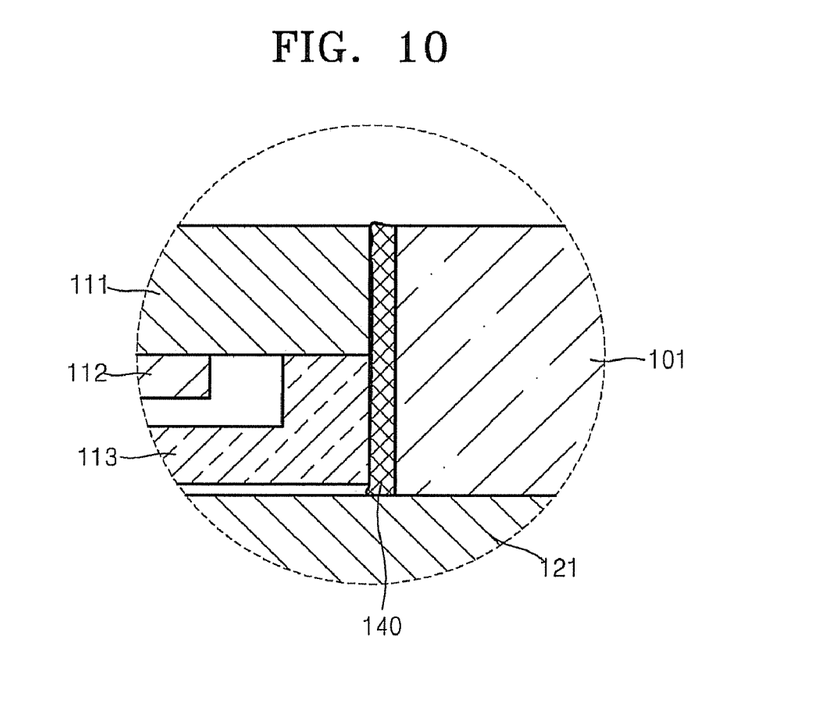

It has thus been exemplarily described in the above-described exemplary embodiment that one of two panels 110 and 120 is made of a hard material and the other is made of a soft material. However, in other exemplary embodiments, both of the panels 110 and 120 may be formed of a hard material, such as glass. In this case, as shown in FIG. 9, a soft material layer 130 may be coated on one of the panels 110 and 120. For example, the soft material layer 130 may be coated on side faces of the substrate 111 and the cover 113 of the first panel 110, such that when the multi-display device 100 is opened, a side face of the transparent plate 101 on the second panel 120 contacts the soft material layer 130. Alternatively, the soft material layer 130 may be coated on a side face of the transparent plate 101, such that when the multi-display device 100 is opened, side faces of the substrate 111 and the cover 113 contact the soft material layer 130. In another case, as shown in FIG. 10, a soft material tape 140 may be attached to one of the panels 110 and 120. For example, the soft material tape 140 may be attached to either the side faces of the substrate 111 and the cover 113 of the first panel 110, or to the side face of the transparent plate 101. In still another case, both of the panels 110 and 120 may be formed of transmissive plastic, and a softer material coating layer or tape may be attached to one of the panels. Although not illustrated, in alternative exemplary embodiments, the soft material layer 130 of FIG. 9 or the soft material tape 140 of FIG. 10 may also be included between overlapping portions of the first and second panels 110, 120 that lie substantially parallel to the display devices 112, 122, in order to form the overlapping interface portion 115. In any case, the interface surface of one of the panels 110, 120 is made of a soft material, and the soft material is elastically compressed and transformed by a hard material so that air gaps cannot be made. As a result, image cutting at a joint of a screen due to a luminance difference is hardly noticed. The soft material layer 130 may be formed of a soft material, for example, Teflon product from DuPont, silicon, or polymethyl methacrylate ("PMMA"), and the soft tape 140 may be an adhesive tape of which surface is processed with the same soft material.

Meanwhile, the display devices 112 and 122 may be any kind of a flat panel display ("FPD"), such as a liquid crystal display ("LCD"), a field emission display ("FED"), a plasma display panel ("PDP"), and an organic light emitting diode ("OLED").

As described above, the multi-display device according to the present invention minimizes image of cutting at a joint between panels due to a luminance difference. As a consequence, a high-quality multi-screen in which an image is naturally connected between the two panels can be embodied. A method of minimizing image cutting at a joint of a screen of a multi-display device is thus made possible, such as by providing a first panel with a first display device and a first interface surface, providing a second panel with a second display device and a second interface surface softer than the first interface surface, and forming the screen by abutting the first interface surface to the second interface surface, wherein the second interface surface is elastically compressed and transformed by the first interface surface.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A multi-display device comprising:
   a first panel including a first display device, the first panel having a first interface surface disposed on an edge surface of the first panel and formed of a hard material; and
   a second panel including a second display device, the second panel having a second interface surface, which contacts the first interface surface and is disposed on an edge surface of the second panel, the second interface surface is formed of a soft material,
   wherein the first panel and the second panel form a screen when stuck fast to each other at the first and second interface surfaces, and
   wherein the soft material is elastically compressed and transformed by the hard material.

2. The multi-display device of claim 1, wherein the hard material is glass, and the soft material is transmissive plastic.

3. The multi-display device of claim 1, wherein the hard material is glass, and the soft material is a soft substance coated on glass.

4. The multi-display device of claim 1, wherein the hard material is glass, and the soft material is a soft adhesive tape attached onto glass.

5. The multi-display device of claim 1, wherein the hard material is transmissive plastic, and the soft material is a soft substance coated on transmissive plastic.

6. The multi-display device of claim 1, wherein the hard material is transmissive plastic, and the soft material is a soft adhesive tape attached onto transmissive plastic.

7. The multi-display device of claim 1, wherein each of the first and second panels further includes:
   a substrate on which a respective display device is installed; and
   a cover protecting the respective display device.

8. The multi-display device of claim 7, wherein the first and second panels are connected with a step difference such that the display devices of the first and second panels form a connected screen, and the second panel further includes a transparent plate installed thereon so that the first and second panels form a substantially planar top surface.

9. The multi-display device of claim 8, wherein the interface surface of the second panel is formed on the transparent plate.

10. The multi-display device of claim 9, wherein the transparent plate includes plastic as the soft material.

11. The multi-display device of claim 9, wherein the cover of the first panel overlaps with the substrate of the second panel, the cover of the first panel and the substrate of the second panel are made of glass, and an air gap is maintained between overlapping portions of the cover of the first panel and the substrate of the second panel.

12. The multi-display device of claim 9, wherein the cover of the first panel overlaps with the substrate of the second panel, the cover of the first panel is made of a material having a different hardness level than a hardness level of the substrate of the second panel, and the first and second interface surfaces of the first and second panels further include overlapping portions between the cover of the first panel and the substrate of the second panel, respectively.

13. The multi-display device of claim 1, wherein the first and second panels are combined in a folded structure.

14. The multi-display device of claim 1, wherein the hard material and the soft material have substantially a same refractive index.

15. A multi-display apparatus comprising:
   a plurality of unit panels, each unit panel including a display device and an interface surface,
   wherein the interface surface of each unit panel, which contacts an interface surface of an adjoining unit panel, is disposed on an edge surface of each respective unit panel, and
   wherein the interface surface of each unit panel has a hardness level different from a hardness level of an interface surface of an adjoining unit panel.

16. The multi-display apparatus of claim 15, wherein an interface surface having a lower hardness level is elastically compressed and transformed by an interface surface having a higher hardness level.

17. The multi-display apparatus of claim 15, wherein the unit panels partially overlap each other, and the interface surface of half of the unit panels is formed on a step difference-eliminating transparent plate.

18. The multi-display apparatus of claim 17, wherein the transparent plate includes plastic having a lower hardness level than an interface surface of an adjoining unit panel.

19. The multi-display apparatus of claim 15, wherein the unit panels are joined together at the interface surfaces and air gaps are prevented from occurring between interface surfaces of joined unit panels.

20. A method of minimizing image cutting at a joint of a screen of a multi-display device, the method comprising:
   providing a first panel with a first display device and a first interface surface disposed on an edge surface of the first panel;
   providing a second panel with a second display device and a second interface surface, which is softer than the first interface surface and is disposed on an edge surface of the second panel; and
   forming the screen by abutting the first interface surface to the second interface surface, wherein the second interface surface is elastically compressed and transformed by the first interface surface.

21. The method of claim 20, further comprising arranging the first and second panels with a step difference, wherein providing the first panel or second panel further includes providing a transparent plate eliminating the step difference and having the first or second interface surface.

22. The method of claim 20, wherein abutting the first interface surface to the second interface surface includes removing an air gap between the first and second panels.

23. The method of claim 20, wherein the first panel includes glass at the first interface, and the second panel includes plastic at the second interface.

24. The method of claim 20, wherein forming the screen includes pivoting the first panel with respect to the second panel.

25. The multi-display device of claim 1, wherein the edge surface of the first panel is normal to a display surface of the first panel, and the edge surface of the second panel is normal to a display surface of the second panel.

26. The multi-display device of claim 15, wherein the edge surface of each unit panel is normal to a display surface of each respective unit panel.

27. The method of claim 20, wherein the edge surface of the first panel is normal to a display surface of the first panel, and the edge surface of the second panel is normal to a display surface of the second panel.

* * * * *